United States Patent [19]

Crane

[11] Patent Number: 5,108,262
[45] Date of Patent: Apr. 28, 1992

[54] HIGH DAMPING FLEXIBLE PROPELLER/IMPLELLER

[75] Inventor: Roger M. Crane, Arnold, Md.

[73] Assignee: The United States of America as represented by the Secretary of the Navy, Washington, D.C.

[21] Appl. No.: 498,139

[22] Filed: Mar. 23, 1990

[51] Int. Cl.⁵ .............................................. F04D 21/32
[52] U.S. Cl. ................... 416/230; 416/224; 416/241 R
[58] Field of Search ........... 416/144, 224, 230, 241 R, 416/241 A

[56] References Cited

U.S. PATENT DOCUMENTS

| | | | |
|---|---|---|---|
| 1,614,186 | 1/1927 | Clay | 416/224 |
| 2,404,678 | 7/1946 | Wuensch | 416/144 |
| 2,435,604 | 2/1948 | Rorden | 416/144 |
| 4,025,231 | 5/1977 | Kochevar et al. | 416/144 |
| 4,097,193 | 7/1978 | Brunsch et al. | 416/224 |
| 4,671,739 | 6/1987 | Read et al. | 416/230 |
| 4,797,066 | 1/1989 | Stromberg | 416/230 |
| 4,954,377 | 9/1990 | Fischer et al. | 428/36.1 |

FOREIGN PATENT DOCUMENTS 1418254 10/1965 France ............................. 416/244

*Primary Examiner*—John T. Kwon
*Attorney, Agent, or Firm*—Charles D. Miller; Gary G. Borda

[57] ABSTRACT

This invention is directed to a high damping and damage tolerant flexible propeller assembly and a method for the production thereof. The high damping and damage tolerant flexible propeller has a unitary hub having an axis of rotation and adapted for mounting on a rotatable shaft, multiple spokes extending from the hub portion, each spoke at its tip portion being made of a high density material having the shape that conforms to that of the specific propeller, each spoke at its inner portion from the tip portion to the hub portion being made of multidimensional fibers, the inner portion of each spoke being made of a multidimensional fiber preform being impregnated with a highly viscoelastic matrix material.

7 Claims, 1 Drawing Sheet

HIGH DAMPING FLEXIBLE PROPELLER/IMPLELLER

The invention described herein may be manufactured and used by or for the Government of the United States of America for governmental purposes without the payment of any royalties thereon or therefor.

BACKGROUND OF THE INVENTION

1. Field of the Invention

This invention is directed to a new flexible high damping, damage tolerant propeller.

2. Brief Description of the Prior Art

Some retractable pitch propellers are currently made using metallic materials. Their basic purpose is to improve the hydrodynamic performance of a boat. When the boat is not under power, the propeller folds up and causes less drag. The structural material used in all cases are metals which have limited strain capability and are permanently deformed when impacted causing degradation to hydrodynamic and acoustic performance.

U.S. Pat. No. 4,097,193 illustrates an elastomeric damping arrangement for damping vibrations of a structural member, such as a vibration prone airfoil, particularly a helicopter rotor blade tending to vibrate under dynamic deformations. The damping materials illustrated are silicones, various rubber compounds or polyurethane with polyurethane being preferred because of its good bonding and processing capabilities.

According to U.S. Pat. No. 4,797,066 the propeller blade at an increased service load automatically optimizes its pitch, thus reducing or preventing cavitation wherein flexibility is obtained for the propeller utilizing plastic materials having anisotropic properties, i.e. from materials with different physical characteristics in different directions. The propeller's improved properties are achieved by having the reinforcement (the armoring) applied in sections, with the reinforcing elements in one section extending in the same direction, but with the reinforcing elements of one section extending in a direction other than the corresponding elements of another section.

SUMMARY OF THE INVENTION

This invention provides a high damping and damage tolerant flexible propeller assembly and a method for the production thereof. The high damping and damage tolerant flexible propeller comprises a unitary hub having an axis of rotation and adapted for mounting on a rotatable shaft, multiple spokes extending from the hub portions each spoke comprising a tip portion and an inner portion, each spoke at its tip portion being made of a high density material having the shape that conforms to that of the specific propeller, each spoke at its inner portion from the tip portion to the hub portion being made using reinforcing fibers such as graphite but not limited to graphite, carbon, glass, kevlar, polyethylene, the inner portion of each spoke being made of a multidimensionally braided fiber preform being impregnated with a highly viscoelastic matrix material.

The method for the production of a high damping and damage tolerant flexible propeller assembly having a unitary hub having an axis of rotation and adapted for mounting on a rotatable shaft which comprises preparing multiple spokes in the shape of a propeller extending from the hub portion, said spokes having a tip portion and an inner portion extending from the tip portion to the hub portion, fabricating the tip portion from a high density material that is conformed to the shape of the propeller, fabricating the inner portion extending from the tip portion to the hub portion which consists of a braided multidimensional fiber preform, placing the assembly into a mold, filling the mold with viscoelastic material, curing the viscoelastic material and removing the entire assembly from the mold.

OBJECTS OF THE INVENTION

An object of the invention is to make a unique propeller and to teach a method for making propeller having high damping and damage tolerant and flexible characteristics.

Another object of the invention is to make a unique propeller and to teach a method for making the propeller that is highly resistant to fouling and corrosion.

A further object of the invention is to make a unique propeller and to teach a method for making the propeller wherein the damping occurs mostly as a result of utilizing high damping materials and by the braiding and crossover pattern utilized at the inner portion of each spoke.

Other objects of the invention are defined in the description of the specification and in the claims supported thereby.

BRIEF DESCRIPTION OF THE DRAWINGS

The accompanying drawings show some embodiments of the invention.

DETAILED DESCRIPTION OF THE INVENTION

Figure 1:
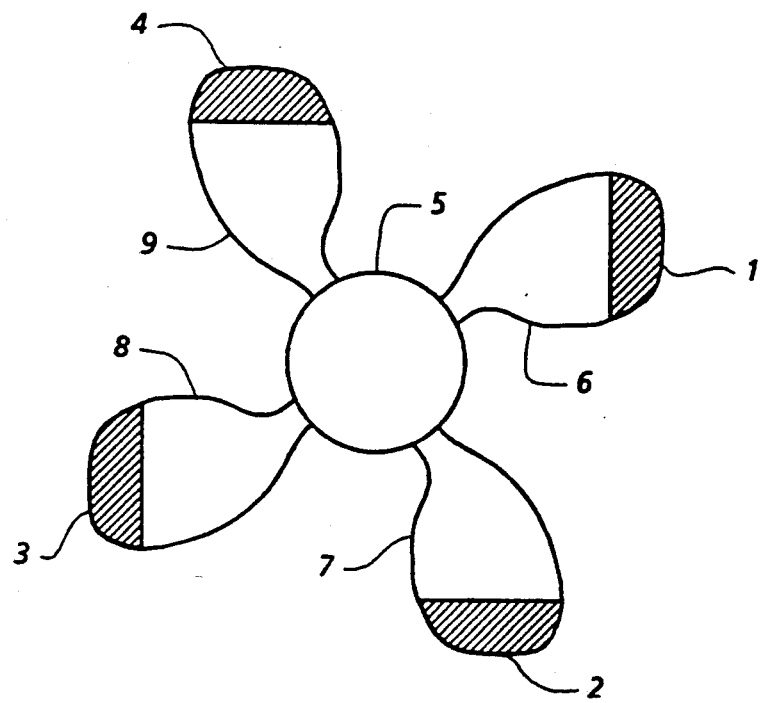
FIG. 1 shows in a front elevational view in accordance with the invention when in a static load condition (Limp).
Figure 2:
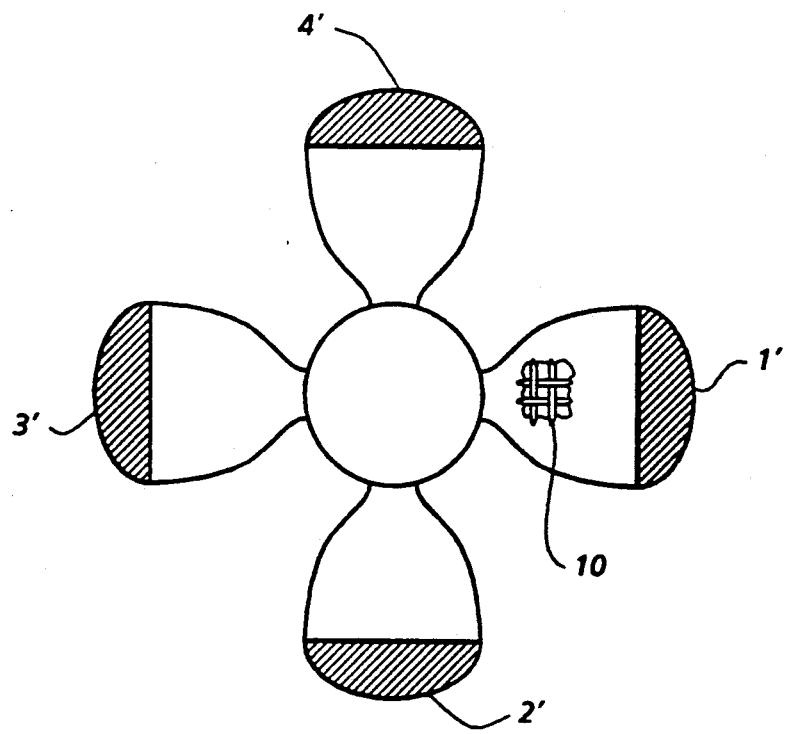
FIG. 2 shows in a front elevational view in accordance with the invention when in a centrifugal loaded condition (Rigid).

A propeller according to the present invention consists of a multidimensionally braided propeller generally illustrated in FIGS. 1 and 2 having multiple spokes or blades made having two portions, namely, a tip portion as illustrated in FIG. 1 by items 1-4 and an inner portion and using high strength or high stiffness fibers or a combination of the two at its inner portion items 6, 7, 8 and 9. The spoke or blade at its inner portion consists of first braiding it with said fibers which includes both the hub area as well as the inner portion. The braiding becomes a multidimensionally fiber perform and is attached to the tip portion of the spoke or blade which is made of a high density material that has the shape that conforms to that of a specific propeller. The high density material making up the tip portion items 1-4 of the spoke or blade has holes, not shown, at various locations at its end nearest the inner portion of the spoke or blade for attachment of the braided fiber preform. The multidimensionally braided propeller is then impregnated with a highly viscoelastic matrix material, as, urethane, polyurethane, nitrile rubber, or other such material having a high vibration damping loss factor. The tip portion as illustrated in FIGS. 1 and 2 by shaded areas 1-4, of the spoke or blade provides a high mass concentration at the tip portion in order to maximize the centrifugal load on the propeller. The tip portion is preferably made of bronze, lead, steel, tungsten and other high density metallic materials. The braided fibers are generally illustrated in FIG. 2 by item 10 which is a magnified view of a portion of the propeller blade. A general explanation of the known art of multidimensionally braided fibers can be found in a report published in October 1984 by the David Taylor Naval Ship Research and Development Center, entitled "The Fabrication, Processing and Characterization of Multidimensionally Braided Graphite/Epoxy Composite Materials" authored by Aleksander Macander, Roger Crane and Eugene Camponeschi. The Report number is DTNSRDC/SME-84-66.

In FIG. 1 is shown a propeller, constructed in accordance with the invention when the propeller is in a static load or limp condition.

FIG. 2 illustrates a propeller, constructed in accordance with the invention when the propeller is in a centrigual loaded or rigid condition.

The strong and stiff fibers of the invention are braided into a multidimensional or matrix composite preform. The type fibers used in the invention consists of fibers, such as, graphite, glass or kevlar which have constant cross section and which are braided to form an integral structure. The preform consists of fibers which traverse in a multitude of directions, including through the thickness of the inner portion. The resulting preform is an integral system possessing characteristics of thickness, width and length and having a predetermined specific shape.

The incorporation of high density material in the form of plates or blocks in the inner portion of the spoke or blade is incorporated to disrupt the various vibration modes and thus assists in damping out certain frequencies. The majority of damping occurs from the constrained layer configuration of the inner portion of the spoke or blade. This occurs basically because the fibers pass through in a multitude of directions. When the propeller is in a loaded condition, a shear occurs in the viscoelastic material at the interface between the viscoelastic material and the strong and stiff fibers. This is a high energy dissipating mechanism. Placing high density material in the composite preform deals with the resonant frequencies of the structure. Composites have a higher damping capability than metals, as well as a lower density. The density of the composite is close to that of water, and for that reason vibrations, heard as noise, are easier to couple into the water. Some vibrational frequencies travel long distances in the water. In order to damp out these frequencies, one way, in accordance with the invention, is to change the natural frequency of the structure by adding concentrated weight to the propeller to change the modal shape or response. The form or shape of the added high density material must be such that it is compatible with the multidimensional braiding process.

The actual fabrication process of the invention consists of first braiding the inner portion of the propeller spoke or blade which includes part of the hub area. The tip portion made of high density material is then attached to the braided inner portion by passing the braiding fibers through the holes in the high density tip portion of the spoke or blade. The braiding is carried out in such a way that it is tight so its cross section is maintained. The entire propeller assembly is then placed in a closed mold and infiltrated via resin transfer or other suitable method so that the braided area is completely filled with the viscoelastic material and contains less than one percent voids. The viscoelastic material is cured and the propeller assembly is removed from the mold.

The propeller, after being removed from the mold is limp as illustrated in FIG. 1 due to the weight of the high density material at the tip portion of the spoke or blade, as well as, the nature of the braid and the viscoelastic material.

It is well known in the propeller design arts that, once placed in rotation, propellers are subject to hydrodynamic forces that produce large longitudinal, circumferential, and tangential stresses on the propeller blades. Prior art propeller designs have been structural in nature, i.e., constructed of strong and stiff materials in order to support the applied loads. The propeller of the present invention is made of flexible materials that are not structural in nature. While under a static load, the propeller is in a limp condition as shown in FIG. 2.

Upon installation of the propeller onto a shaft and placed or set into rotation, the propeller expands or takes the shape desired. This occurs due to the centrifugal load supplied by the high density material located at the tip of each spoke or blade as it is rotated. The exact propeller twist and skew is controlled by the predetermined specific braid pattern. This braid geometry is such that when a centrifugal load is applied to each spoke or blade, the individual fibers will easily move past each other until the crimp angle is reached. The term crimp angle is well known in the art of braided composite structures as evidenced by Fisher and Crane U.S. Pat. No. 4,954,377 at column 1, lines 47 to 55 and column 4, lines 12 to 19. This is basically the point at which the fibers can no longer be pulled past each other. At this point, the spokes or blades can only elongate to the extent that the fibers themsleves elongate. Due to the stiffness of the fibers, the crimp angle is controlled accurately. Moreover, the braid patterns are varied through the thickness of the inner portion of the spoke in both the radial and chord directions to allow for varying degrees of elongation or twist and skew as desired.

The propeller or impeller of this invention is also utilizable for use as pump impellers and fan blades used in ventilation systems wherein silencing or quietness is necessary or desired.

The advantages of the invention are that it is highly damping, damage tolerant and highly resistant to fouling and corrosion. The high damping capability occurs as a result of the high damping material used and by the constrained layer damping that occurs between the crossover sections of the braid pattern. Further, the loading of any section by incorporating sections of high density material in the form of thin plates or other shaped sections causes pertubations in the vibration mode pattern thus allowing necessary and/or desired design characteristics.

What is claimed is:

1. A high damping and damage tolerant propeller comprising:
 a unitary hub having an axis of rotation and adapted for mounting on a rotatable shaft, multiple spokes extending from the hub portion, each spoke being comprised of a tip portion and an inner portion, each spoke at its tip portion being made of a high density material having the shape that conforms to that of the specific propeller, each spoke at its inner portion from the tip portion to the hub portion being made of multidimensionally braided fibers, the inner portion of each spoke being made of a multidimensionally braided fiber preform being impregnated with a highly viscoelastic matrix material.

2. A high damping and damage tolerant flexible propeller as in claim 1 wherein the high density material is selected from the group consisting of bronze, lead, steel and tungsten.

3. A high damping and damage tolerant flexible propeller as in claim 1 wherein the multiple spokes comprise more than two.

4. A high damping and damage tolerant flexible propeller as in claim 1 wherein high density material in the form of thin plates is incorporated within said braided multidimensional fiber preform.

5. A high damping and damage tolerant flexible propeller as in claim 1 wherein high density material in the form of shaped objects is incorporated within said braided multidimensional fiber preform.

6. A high damping and damage tolerant flexible propeller as in claim 1 wherein the highly viscoelastic matrix material is a viscoelastic polymeric material.

7. A high damping and damage tolerant flexible propeller as in claim 1 wherein the highly viscoelastic matrix material is selected from the group consisting of urethane, polyurethane and nitrile rubber.

* * * * *